United States Patent
Rizk et al.

(10) Patent No.: US 12,033,386 B2
(45) Date of Patent: Jul. 9, 2024

(54) AUDIO/VIDEO (A/V) FUNCTIONALITY VERIFICATION

(71) Applicant: INTERNATIONAL BUSINESS MACHINES CORPORATION, Armonk, NY (US)

(72) Inventors: Yara Rizk, Cambridge, MA (US); Vatche Isahagian, Belmont, MA (US); Vinod Muthusamy, Austin, TX (US); Rania Khalaf, Newton, MA (US); Merve Unuvar, Manhattan, NY (US); Sampath Dechu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 17/656,435

(22) Filed: Mar. 25, 2022

(65) Prior Publication Data

US 2023/0306740 A1    Sep. 28, 2023

(51) Int. Cl.
 *G06V 20/40* (2022.01)
 *G06V 10/75* (2022.01)
 (Continued)

(52) U.S. Cl.
 CPC ............ *G06V 20/48* (2022.01); *G06V 10/751* (2022.01); *G06V 20/62* (2022.01);
 (Continued)

(58) Field of Classification Search
 CPC ............. G06V 20/48; G06V 30/19007; G06V 10/751; G06V 20/62; G10L 25/57; H04L 65/403; H04L 65/80
 (Continued)

(56) References Cited

U.S. PATENT DOCUMENTS

| 6,169,896 B1 * | 1/2001 | Sant ...................... H04W 24/00 455/67.14 |
| 6,246,803 B1 * | 6/2001 | Gauch .................... H04N 17/02 348/E17.003 |

(Continued)

FOREIGN PATENT DOCUMENTS

| CN | 111355950 A | 6/2020 |
| CN | 113923441 A | 1/2022 |

OTHER PUBLICATIONS

Notification of transmittal of the International Search Report and the Written Opinion of the International Searching Authority or the Declaration for Application PCT/CN2023/083285 Jul. 12, 2023, 7 pages.

(Continued)

*Primary Examiner* — Binh Kien Tieu
(74) *Attorney, Agent, or Firm* — James L. Olsen

(57) ABSTRACT

Aspects of the present disclosure relate to audio/video (A/V) stream functionality verification. A stream segment of a video feed prior to transmission over a network as captured by a transmitting device within a web-based conference can be stored. A stream segment of the video feed after transmission over the network as received by a receiving device within the web-based conference can be stored. The stream segment of the video feed prior to transmission over the network can be compared with the stream segment of the video feed after transmission over the network to determine a video feed quality.

17 Claims, 8 Drawing Sheets

(51) Int. Cl.
*G06V 20/60* (2022.01)
*G06V 20/62* (2022.01)
*G06V 30/19* (2022.01)
*G10L 25/57* (2013.01)
*H04L 65/403* (2022.01)
*H04L 65/80* (2022.01)

(52) U.S. Cl.
CPC ........ *G06V 30/19007* (2022.01); *G10L 25/57* (2013.01); *H04L 65/403* (2013.01); *H04L 65/80* (2013.01)

(58) Field of Classification Search
USPC ...................................................... 348/14.08
See application file for complete search history.

(56) References Cited

U.S. PATENT DOCUMENTS

| | | | |
|---|---|---|---|
| 7,672,841 B2* | 3/2010 | Bennett | G06F 16/3344 |
| | | | 704/270.1 |
| 9,626,577 B1* | 4/2017 | Yu | G06V 20/63 |
| 10,264,214 B1 | 4/2019 | Kumar | |
| 10,687,021 B2 | 6/2020 | Ma | |
| 11,600,263 B1* | 3/2023 | Blair | G06V 40/172 |
| 2006/0031469 A1* | 2/2006 | Clarke | H04L 43/16 |
| | | | 709/224 |
| 2007/0276658 A1* | 11/2007 | Douglass | G10L 21/0364 |
| | | | 704/205 |
| 2012/0116748 A1* | 5/2012 | Kore | G10L 15/26 |
| | | | 704/2 |
| 2013/0235146 A1 | 9/2013 | Schaefer | |
| 2015/0026595 A1 | 1/2015 | Lu | |
| 2018/0034581 A1 | 2/2018 | Gupta | |
| 2018/0278669 A1 | 9/2018 | Davies | |
| 2019/0141289 A1 | 5/2019 | Rosenberg | |
| 2020/0243094 A1* | 7/2020 | Thomson | G10L 15/28 |
| 2020/0274911 A1 | 8/2020 | Gargaro | |
| 2020/0358983 A1* | 11/2020 | Astarabadi | G06V 40/171 |

OTHER PUBLICATIONS

Disclosed Anonymously et al, "Web Conference Screenshare Health Check ", ip.com Prior Art Database Technical Disclosure, IPCOM000267039D, Sep. 17, 2021.

Mell et al., "The NIST Definition of Cloud Computing", National Institute of Standards and Technology, Special Publication 800-145, Sep. 2011, 7 pages.

* cited by examiner

AUDIO/VIDEO (A/V) FUNCTIONALITY VERIFICATION

BACKGROUND

The present disclosure relates generally to the field of computing, and in particular, to verifying the functionality of audio/video feeds.

Web-based conferences have become increasingly common due to the recent increase in remote work. Web conferencing software facilitates communication between individuals online via transmission of audio/video (A/V) data of the individuals in real-time over a network.

SUMMARY

Embodiments of the present disclosure are directed to a method, system, and computer program product for audio/video (A/V) stream functionality verification. A stream segment of a video feed prior to transmission over a network as captured by a transmitting device within a web-based conference can be stored. A stream segment of the video feed after transmission over the network as received by a receiving device within the web-based conference can be stored. The stream segment of the video feed prior to transmission over the network can be compared with the stream segment of the video feed after transmission over the network to determine a video feed quality.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
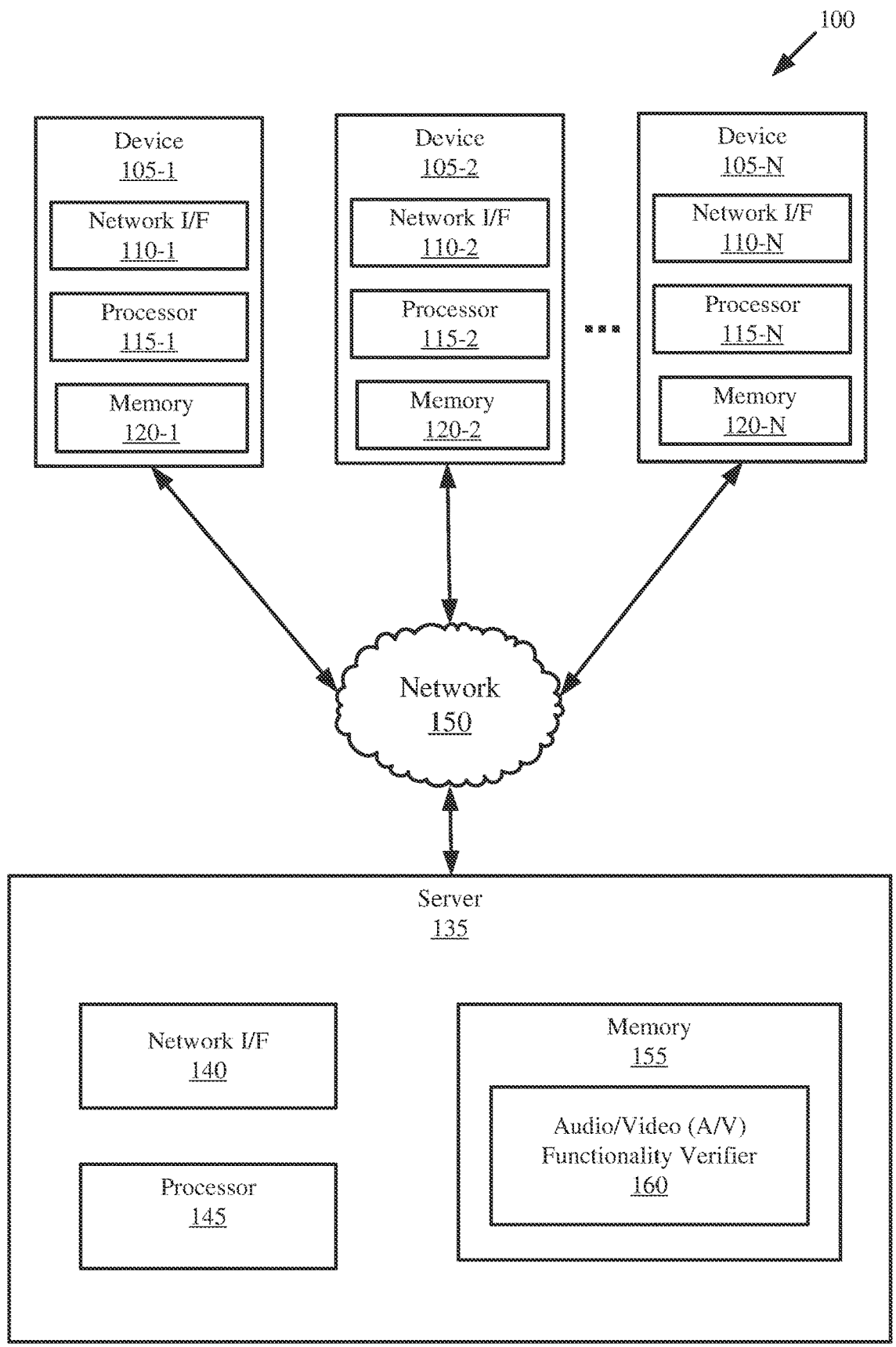
FIG. 1 is a block diagram illustrating an example computing environment in which illustrative embodiments of the present disclosure can be implemented, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to computing, and in particular, to verifying the functionality of audio/video feeds. While the present disclosure is not necessarily limited to such applications, various aspects of the disclosure can be appreciated through a discussion of various examples using this context.

Web-based conferences have become increasingly common due to the recent increase in remote work. Web conferencing software facilitates communication between individuals online via transmission of audio/video (A/V) data of the individuals in real-time over a network.

It is common for individuals to experience connection issues when participating in web-based conferences. For example, users will typically frequently check with other participants regarding whether their video feed is clear, legible, audible, and free from network issues (e.g., latency issues, jitter, lag spikes, etc.). The verification of audio/video (A/V) feeds by participants can be completed based on whether participants can audibly hear the presenter or whether participants can clearly see the participants screen/video feed. This can consume valuable time that was to be designated for the topic of the web-conference. Additionally, verifying audio/video feeds via screen sharing can result in sharing of confidential information that was not intended nor authorized to be shared with participants within the web-based conference. Further still, errors can occur within presentations within web-based conferences as a result of network issues (e.g., due to clarity, legibility, and/or audibility complications).

Aspects of the present disclosure relate to audio/video (A/V) functionality verification. A stream segment of a video feed prior to transmission over a network as captured by a transmitting device within a web-based conference can be stored. A stream segment of the video feed after transmission over the network as received by a receiving device within the web-based conference can be stored. The stream segment of the video feed prior to transmission over the network can be compared with the stream segment of the video feed after transmission over the network to determine a video feed quality.

Aspects of the present disclosure advantageously enable the verification of functionality of A/V streams transmitted through web-based conferences. This can be completed automatically without user intervention (e.g., based on text recognition, speech recognition, image comparison algorithms, etc.). Further, A/V functionality verification can be completed with higher accuracy and in a shorter amount of time. Thus, time can be saved for users within web-based conferences as manual checking of A/V functionality may not be required. Further, sharing of sensitive data and/or errors during presentations can be prevented as a result of automatic A/V feed verification. Aspects of the present disclosure improve the functionality of web-based conferences, as network quality, legibility, audibility, and clarity complications associated with A/V feeds can be addressed without requiring manual verification.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 7.

The server 135 includes an audio/video (A/V) functionality verifier 160. The A/V functionality verifier 160 can be configured to verify the functionality of A/V streams transmitted over network 150 (e.g., between participant devices 150-1 and 150-2). The A/V functionality verifier 160 can first be configured to store a stream segment corresponding to a video feed transmitted by a presenter (e.g., a user sharing A/V content over the network 150). The stream segment can portion/chunk the video feed captured over a particular time period (e.g., a time-based or size-based video chunk). The stored stream segment can be considered lossless (e.g., high quality), as it can be captured by the transmitting device (e.g., locally recorded on the transmitter device) prior to transmission over the network 150. Thus, the A/V functionality verifier 160 first obtains a stream segment of a video feed prior to transmission over the network 150. This can be used as a reference for comparison to verify functionality of the video feed over the network 150.

Thereafter, upon transmission of the stream segment over the network 150, the A/V functionality verifier 160 stores a stream segment after transmission over the network 150 as received by a receiving device. Thereafter, aspects of the stream segment before (e.g., as captured by the transmitting device) and after (e.g., as captured by the receiving device) transmission over the network 150 can be compared to determine fidelity between the stream segments (e.g., a value indicative of the match between the transmitted and received stream segments).

Various techniques can be used to verify functionality of the A/V feed transmitted over the network 150. In some embodiments, text recognition (e.g., optical character recognition (OCR)) can be performed on the stream segment prior to transmission and the stream segment after transmission to determine whether legibility of characters within the video feed is maintained after transmission (e.g., based on whether the same displayed characters can be recognized before and after transmission). In some embodiments, speech recognition (e.g., speech-to-text (STT)) can be performed on the stream segment prior to transmission and the stream segment after transmission to determine whether audibility is maintained after transmission (e.g., based on whether the same uttered words can be recognized before and after transmission). In some embodiments, image comparison (e.g., pixel matching) can be performed between image frames of the stream segment prior to transmission and image frames of the stream segment after transmission to determine whether image resolution/quality is maintained after transmission. In some embodiments, object recognition can be performed on the stream segment prior to transmission and after transmission to determine whether clarity is maintained (e.g., based on whether the same objects can be recognized before and after transmission). In some embodiments, the A/V functionality verifier 160 can be configured to display the stream segment after transmission as received by at least one device on the presenter's device such that the presenter can see the quality of the video feed they transmitted within the web-based conference.

In embodiments, a fidelity score can be calculated based on the above comparisons to indicate the match between the stream segments before and after transmission over the network 150. In embodiments, a visual cue can be provided to the presenter/participants to indicate the results of the comparison. For example, a green light/red light or thumbs up/thumbs down can be displayed on the presenter's screen (e.g., within the web-based conference software), indicating whether the video feed quality is acceptable or not (e.g., based on a comparison between the fidelity score and a threshold). As another example, the fidelity score and the corresponding data used to calculate the fidelity score (e.g., OCR match percentage, STT match percentage, pixel match percentage, etc.) can be displayed to the presenter.

Though reference is made to comparisons between stream segments prior to transmission and after transmission over network 150, it is noted that multiple comparisons can be completed for each receiving device within a web-based conference. For example, the quality of the stream segment after transmission may differ between a first receiving device and a second receiving device (e.g., the first receiving device may have acceptable loss while the second receiving device may have unacceptable loss). Thus, aspects recognize that multiple comparisons can be completed for each respective participant within a web-based conference. This can allow the presenter to know which participants are experiencing video quality issues, whether the issues pertain to location (e.g., geographic location of participants), whether the video quality issues are pervasive (e.g., whether all participants have similar video quality, which can indicate an issue with the video conferencing server or the presenter's network), and other indications based on the comparison results between multiple participants.

Though this disclosure pertains to the collection of personal data (e.g., video stream segments), it is noted that in embodiments, users opt-in to the system (e.g., A/V functionality verifier 160). In doing so, they are informed of what data is collected and how it will be used, that any collected personal data may be encrypted while being used, that users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
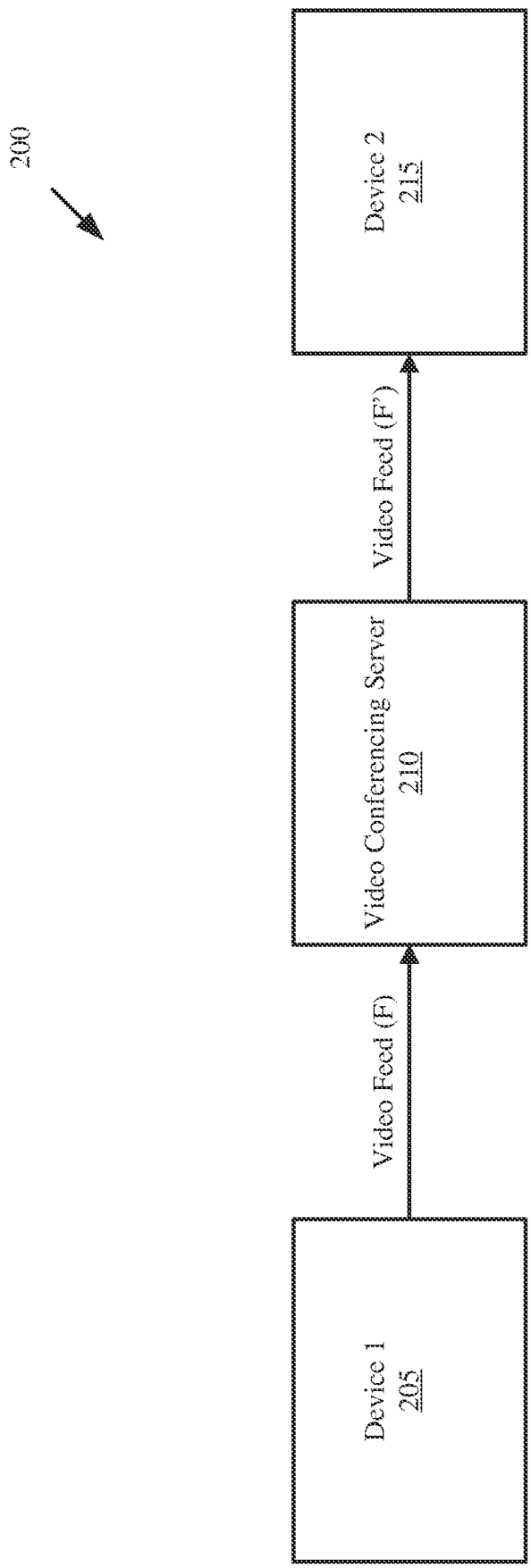
FIG. 2 is a block diagram depicting transmission of a video feed from a first device to a second device through a video conferencing sever, in accordance with embodiments of the present disclosure.

Referring now to FIG. 2, shown is a high level diagram of system 200 depicting the transmission of a video feed from a first device 205 to a second device 215 through a video conferencing server 210. As shown in FIG. 2, the video feed (F) transmitted from the device 205 may differ from the video feed (F') received by the second device 215. This can occur due to network quality issues associated with the first device 205, video conferencing server 210, and/or the second device 215. Thus, it may be beneficial to capture a video feed stream segment which was transmitted by the first device 205 (e.g., prior to transmission) and compare the video feed stream segment prior to transmission to a video feed stream segment received by the second device 215 after transmission (corresponding to the same stream segment) through the video conferencing server 210. This comparison can be used to verify whether there is a match (e.g., high degree of match, high fidelity, etc.) between the video feed stream segment prior to, and after, transmission. A high degree of match (high fidelity value) can indicate high network quality, where a low degree of match (low fidelity value) can indicate low network quality.

Though FIG. 2 depicts a diagram having a video conferencing server 210, in some embodiments, no video conferencing server 210 may be required. For example, the first device 205 and second device 215 can be directly connected (e.g., the first device 205 or second device 215 can act as a server facilitating transmission of A/V data).

Figure 3:
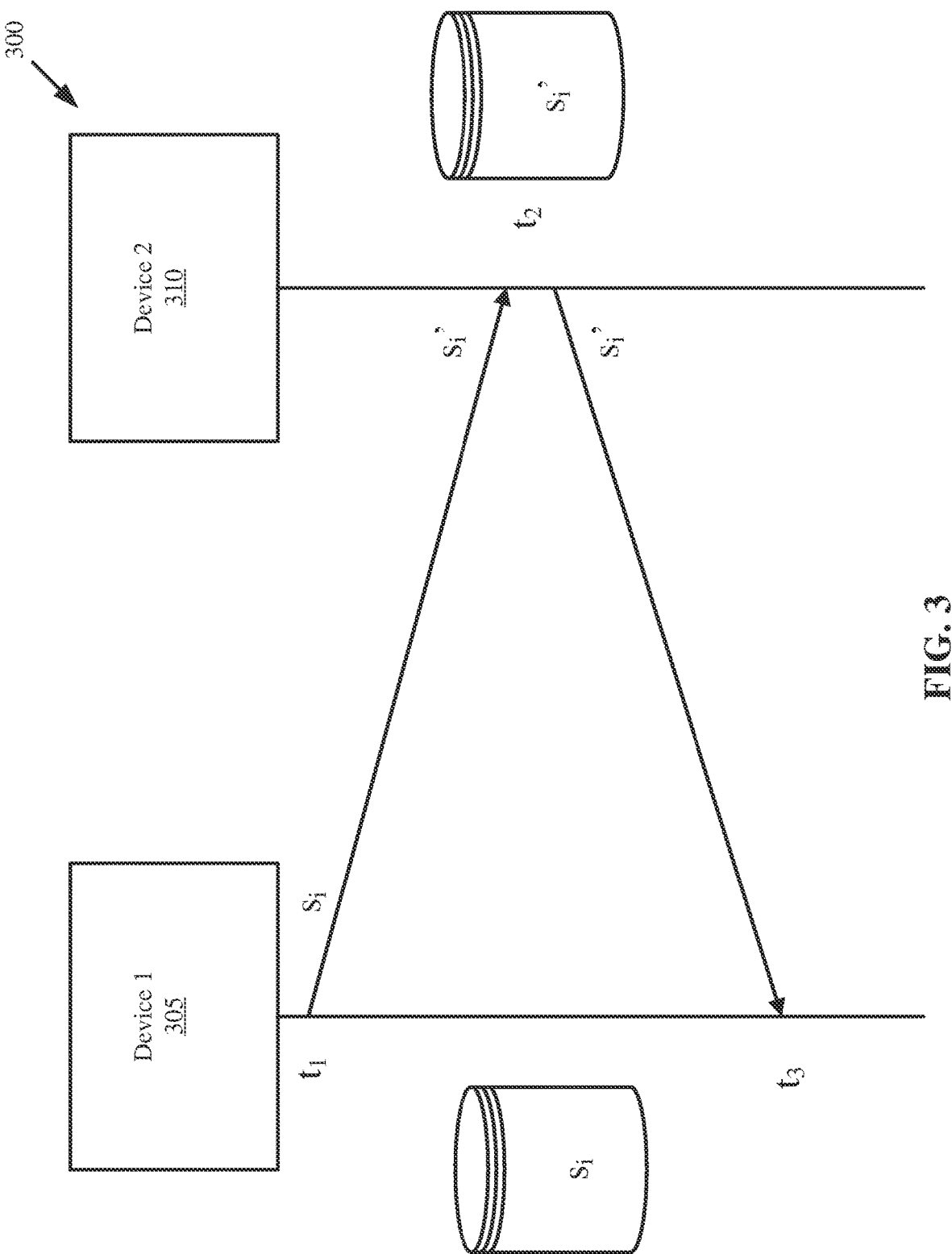
FIG. 3 is a block diagram depicting transmission of a stream segment from a first device to a second device, in accordance with embodiments of the present disclosure.

Referring now to FIG. 3, shown is a high level diagram 300 depicting the transmission of a stream segment $s_i$ from a first device 305 to a second device 310 over a network (not shown). Though not shown, the network and/or server configured to facilitate communication between the first and second devices 305 and 310 can be the same as, or substantially similar to, network 150 and/or video conferencing server 210. As depicted in FIG. 3, at a first time $t_1$, the stream segment $s_i$ originating from the first device 305 is stored (e.g., by A/V functionality verifier 160). The stream segment is received by the second device 310 as $s_i'$ at a second time $t_2$ and is also stored (e.g., by A/V functionality verifier 160). In embodiments, at a third time, $t_3$, the stream segment can be transmitted back to the first device 305 such that the presenter can view how the video feed is received by the second device 310. The stored first stream segment $s_i$ transmitted by the first device and the stored second stream segment $s_i'$ received by the second device can be compared to verify fidelity of the video feed from which they originate.

Figure 4:
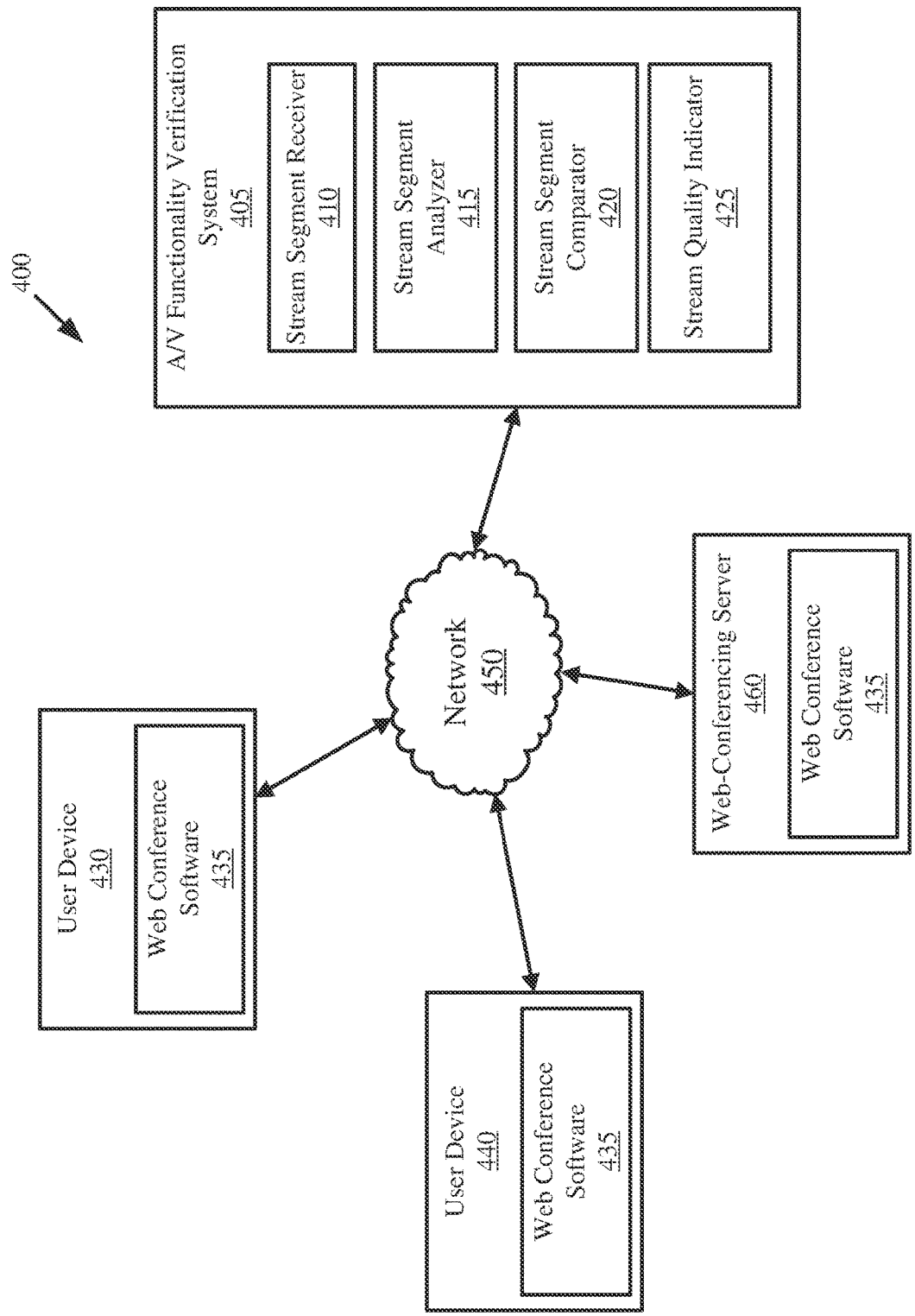
FIG. 4 is a block diagram illustrating an example internet of things (IoT) environment, in accordance with embodiments of the present disclosure.

Referring now to FIG. 4, illustrated is a block diagram of an example Internet of Things (IoT) environment 400 according to aspects of the present disclosure. The IoT environment 400 can include numerous components communicatively coupled by a network 450, such as, but not limited to, an audio/video (A/V) functionality verification system 405, a user device 430, a user device 440, and a web-conferencing server 460. The various components within the IoT environment 400 can be processor executable instructions that can be executed by a dedicated or shared processor using received inputs.

The A/V functionality verification system 405 can be configured to verify the functionality of video feeds (e.g., video streams, A/V data, etc.) transmitted over network 450. The video feeds can be transmitted between user devices 430 and 440 within web conferencing software 435 hosted by a web-conferencing server 460. The A/V functionality verification system 405 includes a stream segment receiver 410, a stream segment analyzer 415, a stream segment comparator 420, and a stream quality indicator 425. The functionality of the stream segment receiver 410, stream segment analyzer 415, stream segment comparator 420, and stream quality indicator 425 can be processor executable instructions that can be executed by dedicated or shared processors using received inputs.

The stream segment receiver 410 be configured to receive a stream segment as transmitted by a presenting device (e.g., user device 430) prior to transmission over network 450. For example, if user device 430 is currently sharing content (e.g., screen sharing, video sharing, audio sharing, etc.), user device 430 can locally store (e.g., capture) a stream segment of the content they are sharing to other participants within web conference software. This stream segment can be considered lossless (e.g., high quality, depending on the video/audio capturing devices) as it contains a segment of video feed prior to transmission over network 450. In embodiments, local capturing of the stream segment prior to transmission over the network 450 can occur within web conference software 435 or other recording software on user devices 430 and 440.

The stream segment receiver 410 can then be configured to receive a stream segment as received by a receiving device (e.g., user device 440) after transmission over network 450 (e.g., through web-conferencing server 460). This steam segment may be lossy (e.g., be prone to network issues such as high latency, jitter, lag, etc.) as it contains a segment of video feed after transmission over network 450. The stream segment captured prior to transmission over network 450 and the stream segment captured after transmission over the network 450 can then be analyzed and compared by stream segment analyzer 415 and stream segment comparator 420 for functionality verification purposes. This process can occur throughout the lifetime of content sharing within web-based conferences. A/V verification can occur periodically, continuously, intermittently, or over any other suitable timing. For example, A/V verification can occur initially upon content sharing within a web-based conference, and may continue to occur throughout the current content sharing session (e.g., stream segments can continuously be collected over any suitable time interval such that A/V functionality can be verified).

Aspects recognize that any suitable stream segment (e.g., portions of A/V data transmitted over the network 450) generation/collection rules can be implemented without departing from the spirit and scope of the present disclosure. For example, stream segments can be generated based on time (e.g., 30 seconds) or size (e.g., 100 MB). Stream segments can be collected over pre-determined time intervals, pre-determined size intervals, based on windowing conditions (e.g., tumbling, sliding, hopping, etc.) or based on specific user requests (e.g., a user manually opts into the A/V functionality verification system 405).

The stream segment analyzer 415 then analyzes the stream segment prior to transmission over network 450 and after transmission over the network 450. The stream segment analyzer 415 can be configured to determine the legibility, clarity, and/or audibility of the stream segments in each segment. The stream segment comparator 420 can then be configured to compare the legibility, clarity, and/or audibility of the stream segments to determine whether there are network/stream issues. As discussed above, this can occur over any suitable timing (e.g., continuously, intermittently, periodically, etc.) within a content sharing session (e.g., within a web-based conference presentation).

For image/video legibility, the stream segment analyzer 415 can be configured to perform textual recognition algorithms (e.g., OCR) on content within the stream segments prior to and after transmission. This can yield a total number of recognized characters and an output of recognized characters in each stream segment. The stream segment comparator 420 can then be configured to compare the text recognition output for each stream segment to determine whether there is a loss of legibility over the network. For example, if the stream segment prior to transmission yielded 55 recognized characters, and the stream segment after transmission yielded 40 recognized characters, this would indicate that only 72.7% of the characters were legible after transmission over the network. In this example, if a threshold was set to 80% such that 80% of characters were required to be legible after transmission over the network to be considered a high quality transmission, then stream quality indicator 425 could indicate that there is network quality (e.g., or legibility) issues resulting from the network transmission (e.g., by providing a visual cue to user devices 430 and 440). It is noted that any suitable text recognition algorithm can be implemented to determine legibility loss without departing from the spirit and scope of the present disclosure. Further, any suitable threshold can be set to dictate whether legibility is acceptable or not (e.g., and thus whether network quality is acceptable or not).

For image/video clarity, the stream segment analyzer 415 can be configured to analyze one or more frames of video within the stream segment prior to transmission over the network and one or more frames of video within the stream segment after transmission over the network 450. This can include determining the resolution of frames, number of pixels, color of pixels, etc. in each stream segment. The stream segment comparator 420 can then be configured to compare the metrics associated with the frames prior to, and after, transmission to determine whether there is a loss of clarity over the network. In embodiments, clarity analysis can be completed by determining the number of matching pixels prior to, and after, transmission over network 450. For example, if an image-based analysis indicates that only 60% of pixels match or are maintained after transmission over the network, and a threshold is set to 80% such that 80% of pixels must match or be maintained after transmission over the network, then stream quality indicator 425 can indicate that there is network quality (e.g., or clarity) issues resulting from the network transmission (e.g., by providing a visual cue to user devices 430 and 440). It is noted that any image analysis techniques (e.g., pixel matching, pixel color matching, pixel number matching, etc.) can be implemented to determine clarity loss without departing from the spirit and scope of the present disclosure. Further, any suitable threshold can be set to dictate whether clarity is acceptable or not (e.g., and thus whether network quality is acceptable or not).

In embodiments, clarity can be determined by applying object recognition algorithms (e.g., a region-based convolutional neural network (R-CNN)) to stream segments prior to and after transmission. Thus, stream segment analyzer 415 can be configured to recognize objects within stream segments (e.g., over a particular number of frames) prior to and after transmission over network 450. Thereafter, stream segment comparator 420 can be configured to determine the number of recognized objects within the stream segment prior to transmission and the number of recognized objects within the stream segment after transmission to determine whether there is a clarity loss. For example, if five objects were recognized prior to transmission and only three objects were recognized after transmission, this would indicate that only 60% of objects were able to be recognized after transmission over the network. In this example, if a threshold was set such that at least 80% of objects are to be recognized after transmission to be considered a high quality stream, then stream quality indicator 425 can be configured to indicate network quality (e.g., or clarity) issues associated with transmission over network 450. It is noted that any suitable object detection techniques (e.g., R-CNNs, scale-invariant feature transformation (SIFT), Viola-Jones, You Only Look Once (YOLO), histogram of oriented gradients (HOG) features, Retina-Net, etc.) can be implemented to determine clarity loss without departing from the spirit and scope of the present disclosure. Further, any suitable threshold can be set to dictate whether clarity is acceptable or not (e.g., and thus whether network quality is acceptable or not).

For audibility (e.g., whether audio data is maintained and able to be recognized after transmission), the stream segment analyzer 415 can be configured to perform speech recognition of the stream segment prior to transmission over the network 450 and speech recognition of the segment after transmission over the network 450. This can yield a number of recognized words and an identity of recognized words (e.g., a speech to text (STT) output) associated with each stream segment. The stream segment comparator 420 can then be configured to compare the speech recognition outputs prior to and after transmission to determine whether there is a loss of audibility over the network. For example, if the stream segment prior to transmission yielded 25 recognized words, and the stream segment after transmission yielded 15 recognized words, this would indicate that only 60% of the words were audible after transmission over the network. In this example, if a threshold was set to 80% such that 80% of words were required to be audible after transmission over the network 450 to be considered a high quality transmission, then stream quality indicator 425 could indicate that there is network quality (e.g., or audibility) issues resulting from the network transmission (e.g., by providing a visual cue to user devices 430 and 440). It is noted that any suitable speech recognition algorithm (e.g., based on hidden Markov models (HMMs), dynamic time warping (DTW), or neural networks, etc.) can be implemented to determine audibility loss without departing from the spirit and scope of the present disclosure. Further, any suitable threshold can be set to dictate whether audibility is acceptable or not (e.g., and thus whether network quality is acceptable or not).

In some embodiments, the stream quality indicator 425 can be configured to present the stream segment after transmission over network 450 back to the presenting device (e.g., device 430) such that a user of the presenting device can ascertain the quality of the stream manually. Feedback from the presenter based on their view of the stream segment after transmission (e.g., acceptable stream quality or unacceptable stream quality) can be provided to the stream quality indicator 425 such that other participants within the web-based conference can be notified of the steam quality.

In embodiments, a fidelity score can be calculated based on one or more weighted factors associated with video feed quality. For example, a fidelity score can be calculated according to a formula Fidelity Score=$factor_1 \times weight_1 + factor_2 \times weight_2 + factor_n \times weight_n$. The fidelity score can then be compared to one or more thresholds to determine whether network quality is acceptable or not. The result of the comparison between the fidelity score and one or more thresholds can be used to indicate stream quality by the stream quality indicator 425.

Values for factors (e.g., $factor_1$-$factor_n$) can be assigned/determined in any suitable manner. For example, assume factors to be considered within the fidelity score include legibility based on recognized text percentage (percentage of recognized text after transmission versus prior to transmission), audibility based on recognized word percentage (percentage of recognized words after transmission versus prior to transmission), and clarity based on pixel matching (percentage of pixels matching between the stream segments after transmission and prior to transmission). In this example, if 70% of text is recognized after transmission (e.g., 70 words recognized after transmission divided by 100 words recognized prior to transmission multiplied by 100%), 85% of words are recognized after transmission (e.g., 85 words recognized after transmission divided by 100 words recognized after transmission multiplied by 100%), and 60% of pixels match after transmission (e.g., 600 pixels of a frame of video after transmission match a frame having 1,000 pixels prior to transmission), then factor values can be calculated as values between 0 and 1 based on the percentages. For example, a first factor corresponding to the legibility factor can have a value of 0.70, a second factor corresponding to the audibility factor can have a value of 0.85, and a third factor corresponding to the clarity factor can have a value of 0.60.

Weights (e.g., $weight_1$-$weight_n$) assigned to factors can similarly be assigned/determined in any suitable manner. In embodiments, factors most likely to be important for indicating network quality can be weighted higher, whereas factors least likely to be important for indicating network quality can be weighted lower. For example, following the example above, the legibility factor can have a weight of 0.35, the audibility factor could have a weight of 0.35, and the clarity factor could have a weight of 0.30. However, any suitable weights can be assigned to factors.

Following the example above, the fidelity score can be calculated as $(0.7 \times 0.35)+(0.85 \times 0.35)+(0.6 \times 0.3)=0.72$. In this example, if a threshold was defined as 0.80 such that any fidelity score exceeding 0.80 leads to a determination that the network quality is high or acceptable, then a determination would be made that the network quality is not acceptable (e.g., 0.72<0.80). The stream quality indicator 425 can then be configured to provide a visual cue (e.g., a thumbs down or red light) indicating that the network quality is low to one or more devices within the web conference software 435. Though reference is made to example calculations, any suitable values can be substituted for those shown without departing from the spirit and scope of the present disclosure. It is noted that any suitable factors (e.g., selected factors/values), weights, and/or thresholds (e.g., network quality thresholds) can be selected/determined without departing from the spirit and scope of the present disclosure.

The stream quality indicator 425 can be configured to provide indicators, visual cues, and/or audio cues to devices (e.g., devices 430 and 440) within the web conference software to indicate the result of the functionality verification processing completed by the A/V functionality verification system 405. For example, based on results determined by the stream segment analyzer 415 and/or stream segment comparator 420 (e.g., comparison between a fidelity value and one or more thresholds), one or more visual and/or audio indications can be displayed/played to devices to indicate whether the network quality is acceptable or not. These can be displayed/played within the web conference software, or transmitted externally (e.g., via email, phone, or another software application).

It is noted that FIG. 4 is intended to depict the representative major components of an example IoT environment 400. In some embodiments, however, individual components can have greater or lesser complexity than as represented in FIG. 4, components other than or in addition to those shown in FIG. 4 can be present, and the number, type, and configuration of such components can vary.

Figure 5:
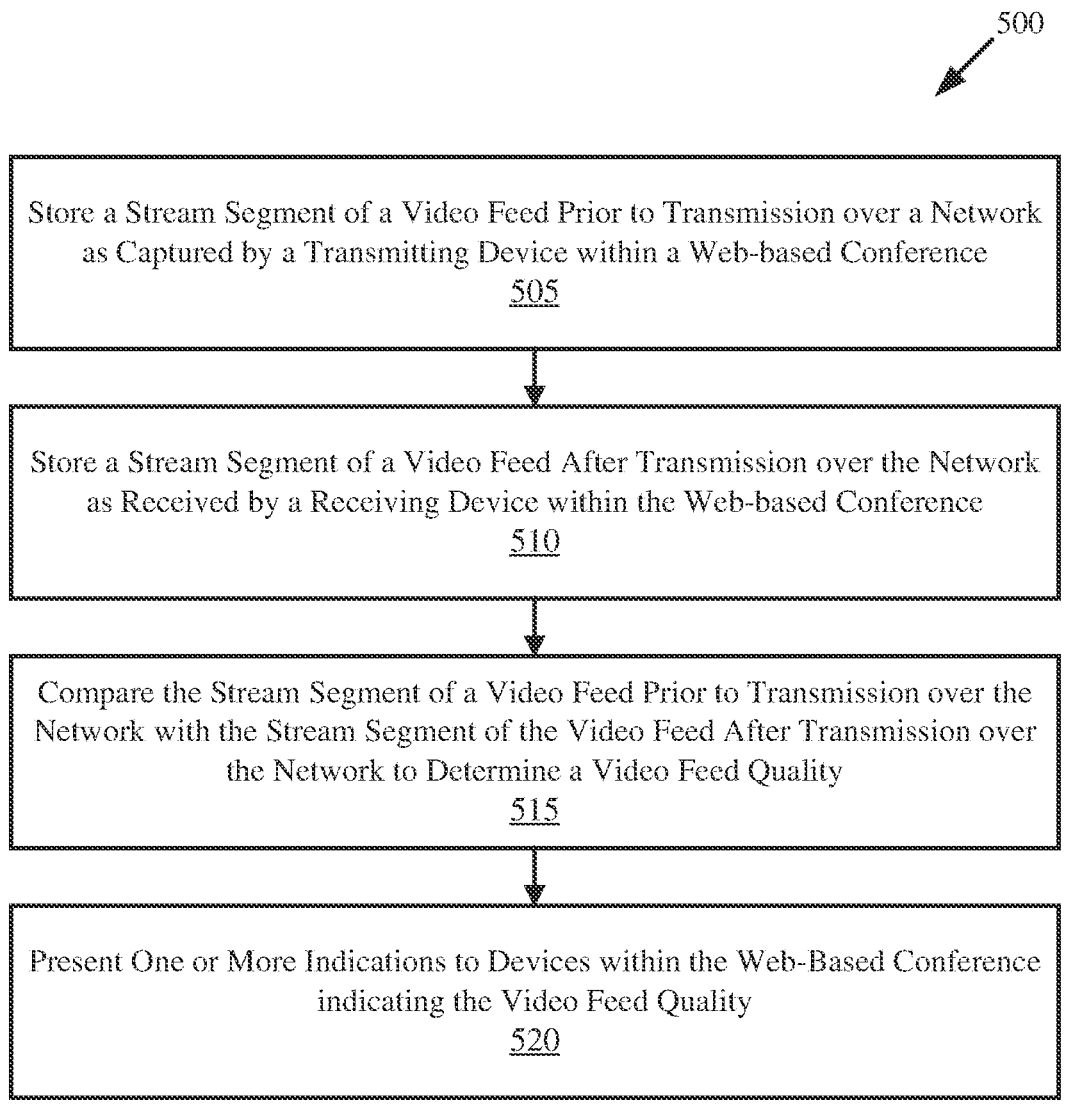
FIG. 5 is a flow-diagram illustrating an example method for audio/video (A/V) functionality verification in web-conferences, in accordance with embodiments of the present disclosure.

Referring now to FIG. 5, shown is a flow-diagram illustrating an example method 500 for audio/video (A/V) feed functionality verification. One or more operations of method 500 can be completed by one or more computing devices (e.g., devices 105 or server 135).

Method 500 initiates at operation 505, where a stream segment of a video feed prior to transmission over a network as captured by a transmitting device (e.g., presenting device) within a web-based conference is stored. Operation 505 can be completed in the same, or a substantially similar manner, as described with respect to FIGS. 1-4.

A stream segment of a video feed after transmission over the network as received by a receiving device within the web-based conference is then stored. This is illustrated at operation 510. Operation 510 can be completed in the same, or a substantially similar manner, as described with respect to FIGS. 1-4.

The stream segment of the video feed prior to transmission over the network can be compared with the stream segment of the video feed after transmission over the network to determine a video feed quality. This is illustrated at operation 515. Operation 515 can be completed in the same, or a substantially similar manner, as described with respect to FIGS. 1-4. For example, text recognition, speech recognition, object detection, image comparison (e.g., pixel matching) and the like can be completed for the stream segment prior to transmission and the stream segment after transmission to determine a fidelity value (e.g., a match value) between the stream segments. A high match can indicate that the network quality (e.g., video feed quality) is high, while a low match can indicate that the network quality (e.g., video feed quality) is low.

One or more indications can then be presented to devices within the web-based conference indicating the video feed quality. This is illustrated at operation 520. Operation 520 can be completed in the same, or a substantially similar manner, as described with respect to FIGS. 1-4. For example, if the video feed quality is indicated as low based on a fidelity score falling below (e.g., not satisfying) a fidelity threshold, then visual and/or audio cues can be presented to the presenter/participants within the web-based conference.

The aforementioned operations can be completed in any order and are not limited to those described. Additionally, some, all, or none of the aforementioned operations can be completed, while still remaining within the spirit and scope of the present disclosure.

Figure 6:
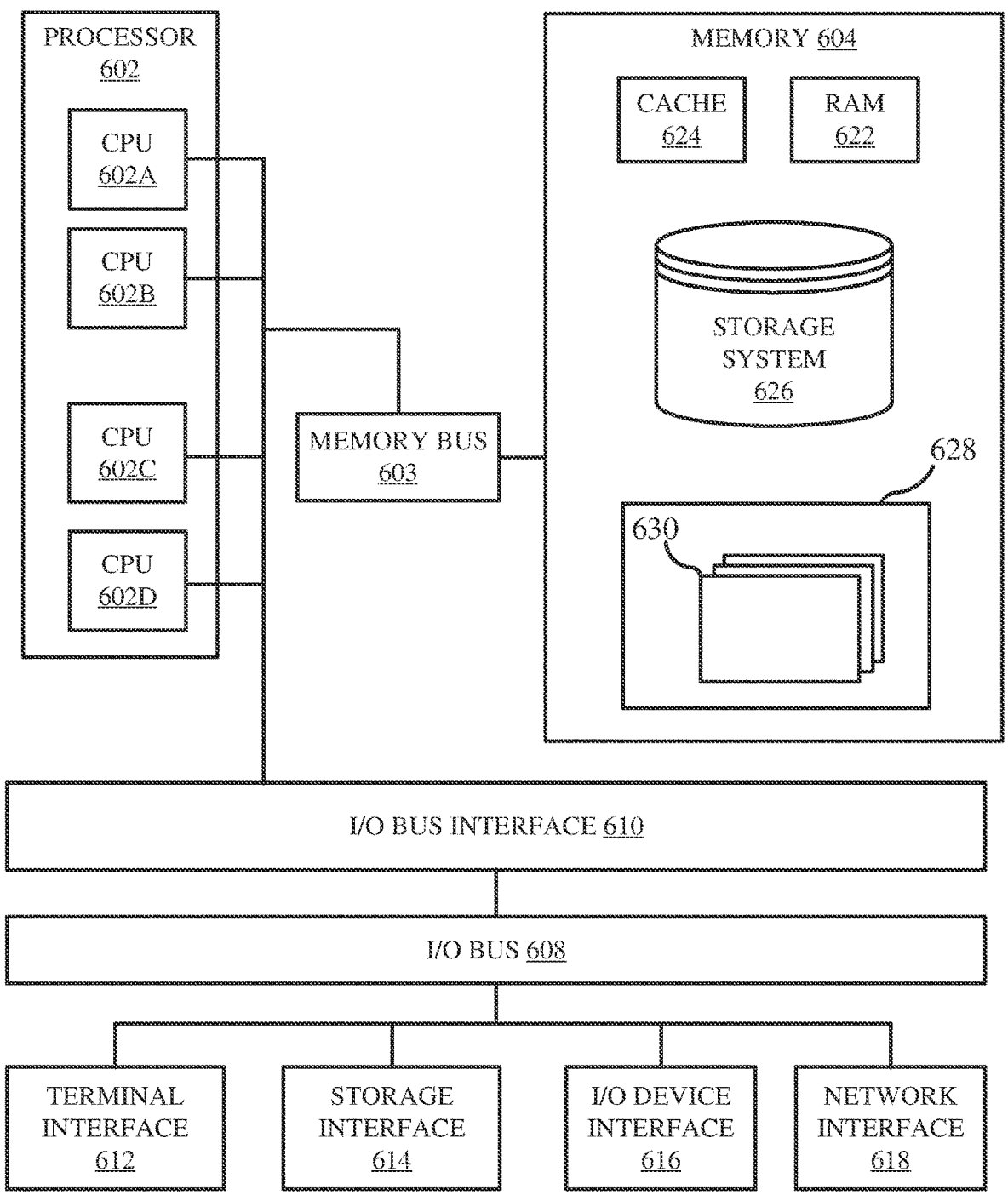
FIG. 6 is a high-level block diagram illustrating an example computer system that can be used in implementing one or more of the methods, tools, modules, and any related functions described herein, in accordance with embodiments of the present disclosure.

Referring now to FIG. 6, shown is a high-level block diagram of an example computer system 601 that may possibly be utilized in various devices discussed herein (e.g., devices 105, server 135, devices 205 and 215, video conferencing server 210, devices 305 and 310, A/V functionality verification system 405, user devices 430 and 440, etc.) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602 (also referred to as processors herein), a memory 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

Memory 604 may include computer system readable media in the form of volatile memory, such as random-access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
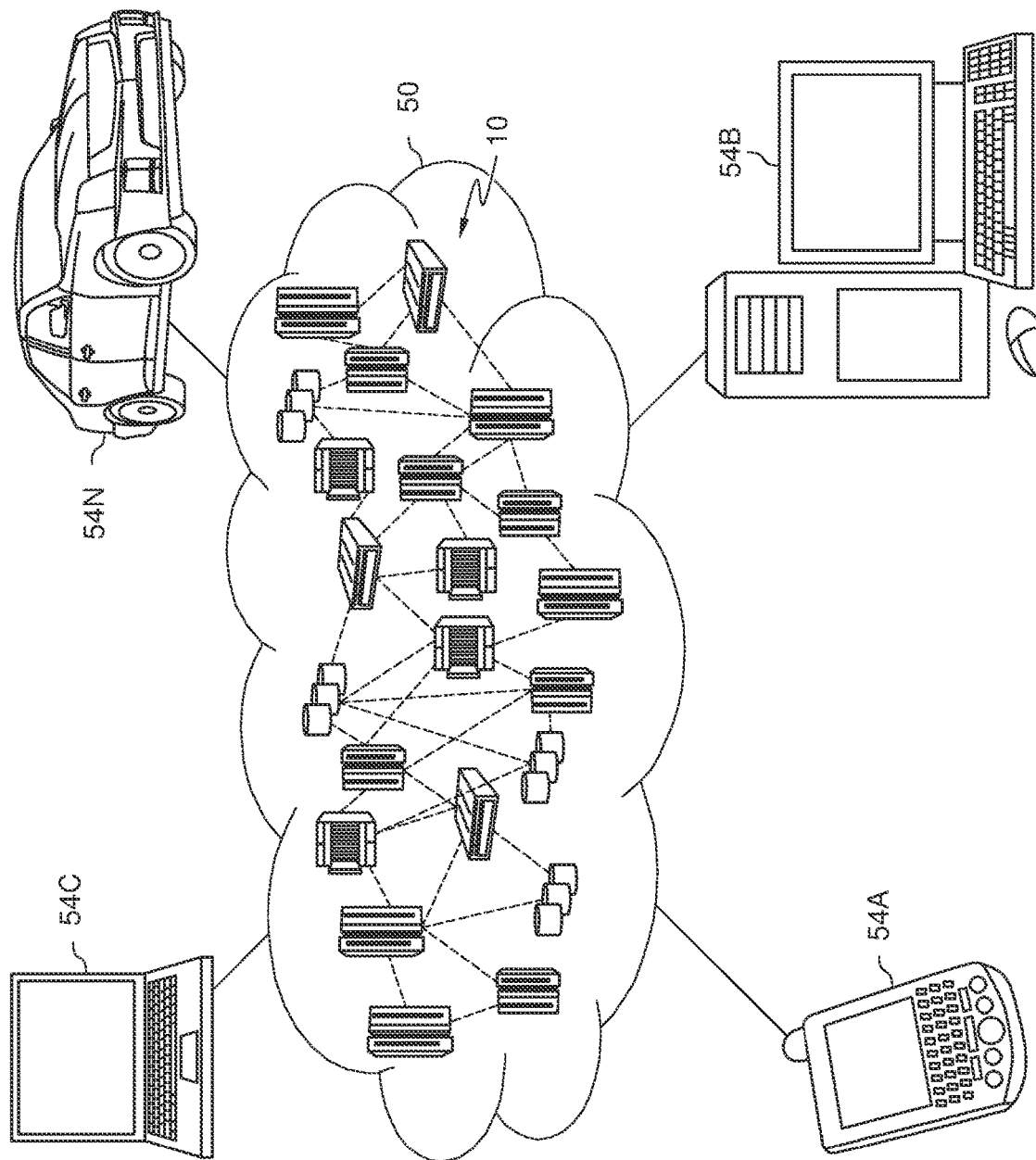
FIG. 7 is a diagram illustrating a cloud computing environment, in accordance with embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
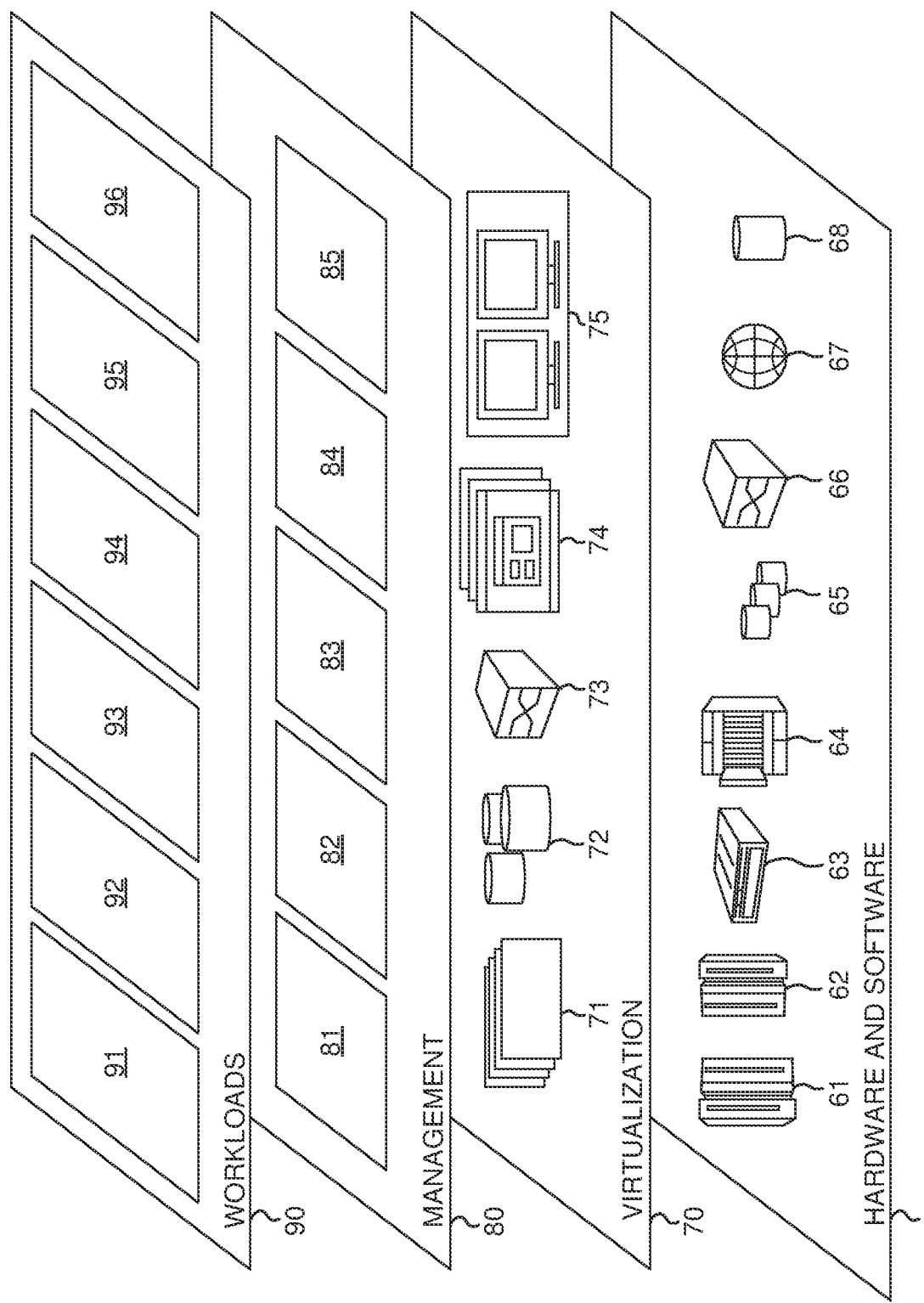
FIG. 8 is a block diagram illustrating abstraction model layers, in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audio/video (A/V) feed functionality verification 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures.

For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   storing a stream segment of a video feed prior to transmission over a network as captured by a transmitting device within a web-based conference;
   storing a stream segment of the video feed after transmission over the network as received by a receiving device within the web-based conference; and
   comparing the stream segment of the video feed prior to transmission over the network with the stream segment of the video feed after transmission over the network to determine a video feed quality by determining a percentage of matching pixels between a first frame of the stream segment of the video feed after transmission over the network and a second frame of the stream segment of the video feed prior to transmission over the network, wherein the percentage of matching pixels is used to indicate the video feed quality.

2. The method of claim 1, further comprising:
   presenting a visual cue on the transmitting device indicating the video feed quality.

3. The method of claim 1, wherein the comparing includes:
   performing a first text recognition on the stream segment of the video feed prior to transmission over the network;
   performing a second text recognition on the stream segment of the video feed after transmission over the network; and
   comparing the first text recognition and the second text recognition to determine the video feed quality.

4. The method of claim 3, wherein a text recognition percentage is calculated by dividing a number of words recognized during the second text recognition by a number of words recognized during the first text recognition, wherein the video feed quality is indicated as high in response to the text recognition percentage exceeding a threshold.

5. The method of claim 1, wherein the comparing includes:
performing a first speech recognition on the stream segment of the video feed prior to transmission over the network;
performing a second speech recognition on the stream segment of the video feed after transmission over the network; and
comparing the first speech recognition and the second speech recognition to determine the video feed quality.

6. The method of claim 5, wherein a speech recognition percentage is calculated by dividing a number of words recognized during the second speech recognition by a number of words recognized during the first speech recognition, wherein the video feed quality is indicated as high in response to the speech recognition percentage exceeding a threshold.

7. A system comprising:
one or more processors; and
one or more computer-readable storage media collectively storing program instructions which, when executed by the one or more processors, are configured to cause the one or more processors to perform a method comprising:
storing a stream segment of a video feed prior to transmission over a network as captured by a transmitting device within a web-based conference;
storing a stream segment of the video feed after transmission over the network as received by a receiving device within the web-based conference; and
comparing the stream segment of the video feed prior to transmission over the network with the stream segment of the video feed after transmission over the network to determine a video feed quality, wherein the comparing includes:
performing a first speech recognition on the stream segment of the video feed prior to transmission over the network;
performing a second speech recognition on the stream segment of the video feed after transmission over the network; and
comparing the first speech recognition and the second speech recognition to determine the video feed quality.

8. The system of claim 7, wherein the one or more computer-readable storage media store additional program instructions which, when executed by the one or more processors, are configured to cause the one or more processors to perform the method further comprising:
presenting a visual cue on the transmitting device indicating the video feed quality.

9. The system of claim 7, wherein the comparing includes:
performing a first text recognition on the stream segment of the video feed prior to transmission over the network;
performing a second text recognition on the stream segment of the video feed after transmission over the network; and
comparing the first text recognition and the second text recognition to determine the video feed quality.

10. The system of claim 9, wherein a text recognition percentage is calculated by dividing a number of words recognized during the second text recognition by a number of words recognized during the first text recognition, wherein the video feed quality is indicated as high in response to the text recognition percentage exceeding a threshold.

11. The system of claim 7, wherein a speech recognition percentage is calculated by dividing a number of words recognized during the second speech recognition by a number of words recognized during the first speech recognition, wherein the video feed quality is indicated as high in response to the speech recognition percentage exceeding a threshold.

12. The system of claim 7, wherein the comparing includes:
determining a percentage of matching pixels between a first frame of the stream segment of the video feed after transmission over the network and a second frame of the stream segment of the video feed prior to transmission over the network, wherein the percentage of matching pixels is used to further indicate the video feed quality.

13. A computer program product comprising one or more computer readable storage media, and program instructions collectively stored on the one or more computer readable storage media, the program instructions comprising instructions configured to cause one or more processors to perform a method comprising:
storing a stream segment of a video feed prior to transmission over a network as captured by a transmitting device within a web-based conference;
storing a stream segment of the video feed after transmission over the network as received by a receiving device within the web-based conference; and
comparing the stream segment of the video feed prior to transmission over the network with the stream segment of the video feed after transmission over the network to determine a video feed quality, wherein the comparing includes:
performing a first text recognition on the stream segment of the video feed prior to transmission over the network;
performing a second text recognition on the stream segment of the video feed after transmission over the network; and
comparing the first text recognition and the second text recognition to determine the video feed quality.

14. The computer program product of claim 13, wherein the one or more computer readable storage media store additional program instructions configured to cause the one or more processors to perform the method further comprising:
presenting a visual cue on the transmitting device indicating the video feed quality.

15. The computer program product of claim 13, wherein a text recognition percentage is calculated by dividing a number of words recognized during the second text recognition by a number of words recognized during the first text recognition, wherein the video feed quality is indicated as high in response to the text recognition percentage exceeding a threshold.

16. The computer program product of claim 13, wherein the comparing includes:
performing a first speech recognition on the stream segment of the video feed prior to transmission over the network;
performing a second speech recognition on the stream segment of the video feed after transmission over the network;
calculating a speech recognition percentage by dividing a number of words recognized during the second speech recognition by a number of words recognized during the first speech recognition;

calculating a text recognition percentage by dividing a number of words recognized during the second text recognition by a number of words recognized during the first text recognition;

calculating a percentage of matching pixels between a first frame of the stream segment of the video feed after transmission over the network and a second frame of the stream segment of the video feed prior to transmission over the network;

calculating a fidelity score based on the speech recognition percentage, the text recognition percentage, and the percentage of matching pixels;

comparing the fidelity score to a fidelity threshold; and outputting an indicator indicating that the video feed quality is low in response to the fidelity score not satisfying the fidelity threshold.

17. The computer program product of claim 16, wherein each of the speech recognition percentage, text recognition percentage, and percentage of matching pixels are weighted while calculating the fidelity score.

* * * * *